(12) United States Patent
Freeman et al.

(10) Patent No.: US 8,919,866 B2
(45) Date of Patent: Dec. 30, 2014

(54) ROOF PANEL TO SIDE-PILLAR HYDROFORMED REINFORCEMENT FOR VEHICLES

(71) Applicant: Ford Global Technologies, LLC, Dearborn, MI (US)

(72) Inventors: Mike James Freeman, Allen Park, MI (US); Gene A. Senn, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 13/826,154

(22) Filed: Mar. 14, 2013

(65) Prior Publication Data

US 2014/0265447 A1    Sep. 18, 2014

(51) Int. Cl.
*B60N 99/00* (2006.01)
*B62D 25/00* (2006.01)

(52) U.S. Cl.
CPC ..................................... *B62D 25/00* (2013.01)
USPC ................................ 296/193.05; 296/203.03

(58) Field of Classification Search
USPC ........................................ 296/193.05, 203.03
See application file for complete search history.

(56) References Cited

U.S. PATENT DOCUMENTS

| 4,462,629 | A  | * | 7/1984  | Todori et al.   ..................... 296/30 |
| 6,010,182 | A  | * | 1/2000  | Townsend ................ 296/203.01 |
| 6,012,765 | A  | * | 1/2000  | Novoa et al. .............. 296/190.08 |
| 6,282,790 | B1 | * | 9/2001  | Jaekel et al. .................. 29/897.2 |
| 6,290,285 | B1 | * | 9/2001  | McCormack ............... 296/182.1 |
| 6,533,348 | B1 | * | 3/2003  | Jaekel et al. ................... 296/205 |
| 6,623,067 | B2 | * | 9/2003  | Gabbianelli et al. .......... 296/205 |
| 6,926,350 | B2 | * | 8/2005  | Gabbianelli et al. ..... 296/203.01 |
| 6,948,768 | B2 | * | 9/2005  | Corcoran et al. ......... 296/190.08 |
| 2001/0000119 | A1 | * | 4/2001  | Jaekel et al. .................... 296/29 |
| 2001/0002760 | A1 | * | 6/2001  | Gabbianelli et al. ........ 296/146.9 |
| 2004/0051345 | A1 | * | 3/2004  | Gabbianelli et al. ..... 296/203.01 |
| 2004/0232731 | A1 | * | 11/2004 | Corcoran et al. ............. 296/205 |
| 2007/0108803 | A1 | * | 5/2007  | Chen et al. ................ 296/203.03 |
| 2014/0015283 | A1 | * | 1/2014  | Freeman et al. .......... 296/193.05 |

* cited by examiner

*Primary Examiner* — Lori Lyjak
(74) *Attorney, Agent, or Firm* — Joseph E. Root

(57) ABSTRACT

A side-support structure mounted over an upper side portion of a vehicle includes an upper horizontal portion attached to a portion of the roof of the vehicle. A central arcuate portion of the side-support structure is attached to a portion of the vehicle between the roof and the side-pillar of the vehicle. The side-support structure also includes a lower vertical portion attached to an upper portion of the side-pillar of the vehicle.

19 Claims, 3 Drawing Sheets

US 8,919,866 B2

ROOF PANEL TO SIDE-PILLAR HYDROFORMED REINFORCEMENT FOR VEHICLES

TECHNICAL FIELD

Embodiments of the present disclosure generally relate to automotive vehicles, and, more specifically, to improvements in localized reinforcement of a vehicle body where the metallic components of the vehicle have been welded together, but before the other subsequent parts and sub-assemblies have been added.

BACKGROUND

During the manufacturing of a vehicle, "Body in White" (BIW) refers to a stage where the metallic components of the vehicle have been welded together, before the other subsequent parts and sub-assemblies are added. Maintaining the overall torsional stiffness of the body in white structure of a vehicle is an extremely critical and difficult attribute to meet. The demand for improved vehicle torsional stiffness has significantly increased over time. Further, for vehicles without package trays, maintaining a specific minimum torsional stiffness is a difficult task.

For vehicles manufactured recently, there is a demand for light weight support structures that can significantly improve torsional stiffness and provide more package space. The major contributing factors towards the torsional stiffness are the rear openings, the upper and lower rear joints, etc., where suitable support structures will be positioned and mounted.

Many kinds of mechanisms and support structures have been deployed to improve the rigidity (stiffness) and load transferring virtue of the side structure of vehicles. Some of these structures are disposed in the upper side portion of the vehicle, between the roof panel and the upper portion of the side pillar of the vehicle. Limitations in the assembly process restrict the regions where such support structures can be disposed. Further, some of these structures are relatively heavy, which is not generally preferred in current vehicles.

Considering these problems and other shortcomings in the art, there exists a need for a mechanism or structure that can provide localized reinforcement to certain portions of a vehicle, and substantially improve the torsional stiffness of the body in white structure of the vehicle.

SUMMARY

The present disclosure provides a hydroformed side-support structure for a vehicle, which significantly improves the BIW torsional stiffness of the vehicle, and efficiently carries the loads between the roof and the body side structure of the vehicle.

According to an aspect, the disclosure provides a hydroformed side-support structure mountable over an upper side portion of a vehicle. The side-support structure includes an upper horizontal portion attached to a portion of the roof of the vehicle. A central arcuate portion of the side-support structure is positioned along a portion of the vehicle between the roof panel and one of the side-pillars. A lower vertical portion of the structure is attached to an upper portion of the side-pillar. Being positioned over the upper side portion, the side-support structure partially carries the load and provides localized reinforcement between the upper side portion and the side pillar of the vehicle.

According to another aspect, the present disclosure provides a hydroformed side-support structure for a vehicle, having an upper portion, a lower portion, and a central arcuate portion connecting the upper portion to the lower portion. The upper portion is mounted in a cavity within a roof panel of the vehicle. The lower portion is mounted over and attached to an upper portion of a side-pillar of the vehicle. The central arcuate portion is positioned over a curved edge of the vehicle between the roof panel and the upper portion of the side pillar. Further, the central arcuate portion transfers loads from the upper portion to the lower portion of the side-support structure.

Additional aspects, features, advantages and objects of the present disclosure would be made apparent from the drawings and the detailed description of the illustrative embodiments, construed in conjunction with the appended claims that follow.

DETAILED DESCRIPTION OF ILLUSTRATIVE EMBODIMENTS

The following detailed description illustrates aspects of the claimed invention and the ways to implement it. However, the description is not intended to define or limit the invention, such definition or limitation being solely contained in the claims appended thereto. Although the best mode of carrying out the invention has been disclosed hereinafter, comprehensively, those in the art will recognize that other embodiments for carrying out or practicing the invention are also possible.

During the process of automotive manufacturing, Body in White (BIW) refers to a stage in which the vehicle's body sheet metal components have been welded together. The vehicle is painted after the doors/closure-panels are added, but prior to the addition/incorporation of other components like the chassis, power train, motor, etc. Computer simulations of crashworthiness, manufacturability, and torsional stiffness of the vehicle are required before the vehicle is converted into a body in white structure.

The torsional stiffness of the body in white structure is extremely crucial, and is often difficult to achieve. Several kinds of support structures and mechanisms have been used to provide torsional stiffness, and for effective load transfer within the body in white structures of vehicles. The current demands include usage of reduced weight package structures, and there is a concurrent need for the availability of more package space for improved customer stowage and overall customer satisfaction.

This disclosure provides a support structure that substantially improves the torsional stiffness of the body in white structure of a vehicle, and also provides effective localized reinforcement at certain portions of the vehicle. The structure is further efficient in carrying the load between the upper rear portion and the rear side pillar of a vehicle from both the cost and weight perspectives.

Figure 1:
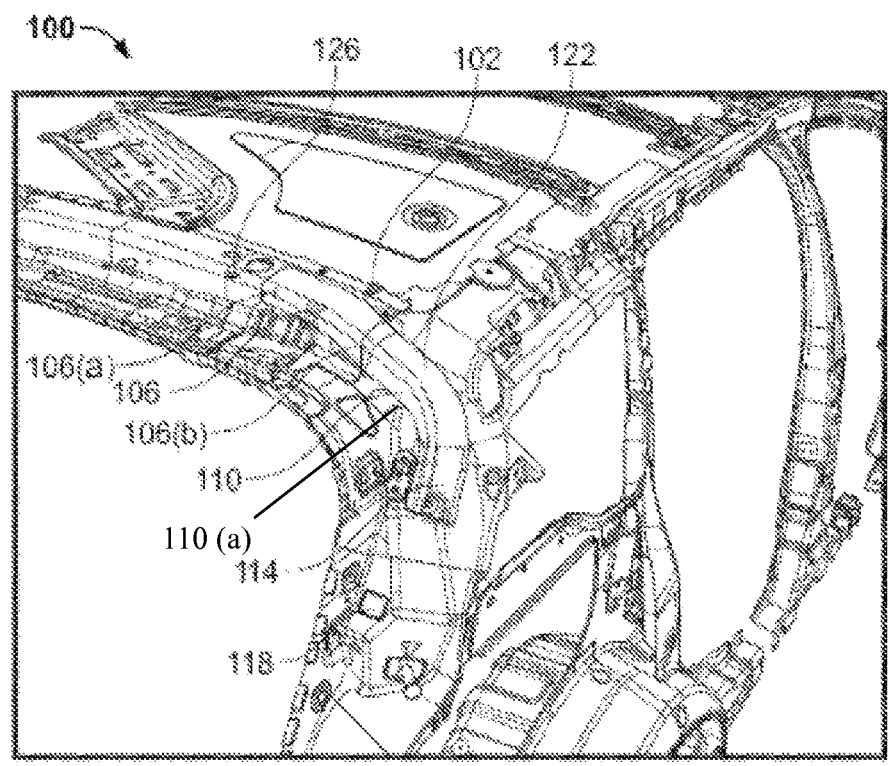
FIG. 1 is a rear perspective view of a portion of a vehicle, having a side-support structure mounted between an upper side portion and a side-pillar of the vehicle, according to an embodiment of the present disclosure.

FIG. 1 is a rear perspective view of a vehicle 100, having a side-support structure 102 mounted over an upper side portion of the vehicle, according to an embodiment of the present disclosure. Specifically, the side-support structure 102 is mounted between the rear roof panel 126 and the upper portion of a rear side pillar 118 of the vehicle. Mounted as shown, the side-support structure is configured to partially transfer the loads from the upper side portion to the side pillar of the vehicle.

The side-support structure 102 includes an upper portion, which is an upper horizontal portion 106 having a continuous closed structure/section. The upper horizontal portion 106 is positioned and mounted over the edge of the roof of the vehicle, in a manner so that it rests within a cavity 122 existing within the edge of the roof panel 126. The horizontal portion 106 has a first portion 106 (a) having a substantially uniform rectangular cross-section. A second portion 106 (b) of the horizontal portion 106 is slightly declined in orientation, with respect to the first portion 106 (a), and has a tapering cross-section. Further, the second portion 106 (b) merges with, and is integrally fused to a central arcuate portion 110 of the side-support structure 102. Though shown as being of rectangular cross-section, other appropriate cross-sectional shapes for the first portion 106 (a) and the second portion 106 (b) of the upper horizontal portion 106 are also contemplated.

A central arcuate portion 110 connects the upper horizontal portion 106 to a vertical portion 114 of the side-support structure 102. The central arcuate portion 110 is mounted and positioned over a portion of the vehicle 100 between the rear roof panel 126 and the side-pillar 118. Further, the arcuate portion 110 has a bent structure, having a curvature matching the curvature of the bent portion of the vehicle along the edge between the roof panel 126 and the side-pillar 118. As shown, the arcuate portion 110 has a base 110 (a) that directly contacts and rests over the bending corner portion of the roof panel 126. Specifically, the base 110 (a) of the arcuate portion 110 has a surface profile substantially matching the profile of the surface of the portion between the roof panel 126 and the side-pillar 118. This facilitates proper positioning of the central arcuate portion 110 over the surface between the roof panel and the side pillar. In a preferred embodiment, the central arcuate portion 110 has a rectangular cross-section, though other appropriate cross-sectional shapes are also contemplated. The major function of the central arcuate portion 110 is to carry and transfer loads from the upper horizontal portion 106 to the vertical portion 114 of the side-support structure 102.

The vertical portion 114 acts as a lower portion of the side-support structure 102, and is positioned and mounted over the upper portion of the side-pillar 118 of the vehicle. Specifically, a lower end of the vertical portion 114 is attached to an upper portion of the side-pillar 118. Further, the vertical portion 114 fuses with one end of the central arcuate portion 110, and thus, it has an aligning end having a cross-sectional shape matching the cross-sectional shape of the central arcuate portion 110. Positioned in a substantially vertical orientation, the vertical portion 114 is configured to transfer any loads carried by the side-support structure 102, to the lower portions of the vehicle, such as the underbody structure and the side-sill structure of the vehicle, through the side-pillar 118.

Preferably, the vertical portion 114 has a rectangular and flattened cross-section, as compared to the cross-section of the upper horizontal portion 106. Other appropriate alternative cross-sectional shapes for the vertical portion 114 are also contemplated, and hence, the depicted shape is not intended to limit the scope of the present disclosure.

In a preferred embodiment, the side-support structure 102 is spot-welded to the upper side portion of the vehicle, at multiple locations (not shown). However, the side-support structure 102 may also be soldered, brazed or mechanically fastened to the upper side portion of the vehicle.

The side-support structure 102 has a hollow tubular structure, is formed by a conventional hydroforming technique. In a preferred embodiment, the side-support structure is formed of a metallic material, or a metallic alloy. However, other suitable materials for manufacturing the side-support structure 102 are also contemplated. Further, the upper horizontal portion 106, the central arcuate portion 110 and the lower vertical portion 114 impart an L-shape to the side-support structure, with the horizontal portion 106 and the vertical portion 114 forming the arms of the L-shaped structure.

Positioned in the illustrated manner, the side-support structure 102 carries the load between the upper side portion and the upper portion of the side-pillar 118 of the vehicle, and increases the torsional stiffness of the upper side portion of the vehicle.

Figure 2:
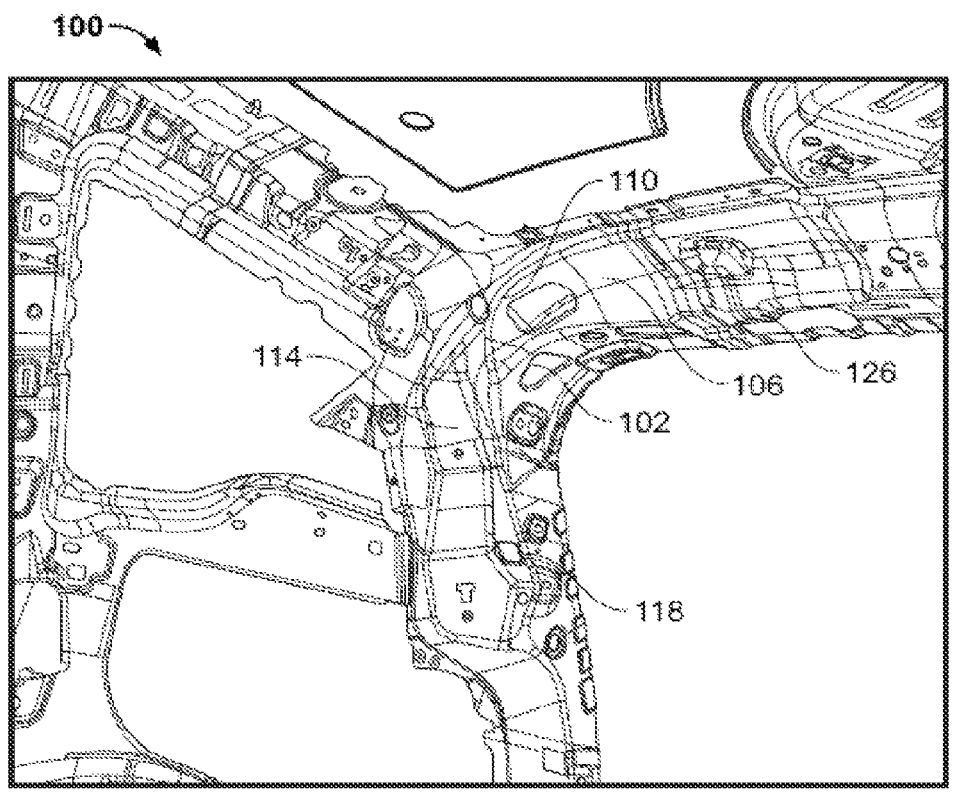
FIG. 2 is a view of a rear side portion of a vehicle, from the interior of the vehicle, depicting the vehicle having the side-support structure positioned and mounted between the upper side portion and the side-pillar, according to an embodiment of the present disclosure.

FIG. 2 is a perspective view of an inner portion of the vehicle 100, with the side-support structure 102 of FIG. 1 mounted over an upper rear side portion of the vehicle. As mentioned earlier, while being mounted, the lower vertical portion 114 of the side-support structure 102 is positioned over the upper portion of the side pillar 118, and the upper horizontal portion 106 is mounted over the rear edge of the vehicle, over the roof panel 126. Though shown as being positioned between the rearmost side-pillar (i.e., the D-pillar) and rear edge of the roof panel 126, the side-support structure 102 may also be positioned and mounted between the upper side portion of the vehicle and any other side-pillar, such as, the A-pillar or the B-pillar of the vehicle, to transfer loads from the upper side portion to that particular side-pillar, and to increase the torsional stiffness of the upper side portion.

Figure 3:
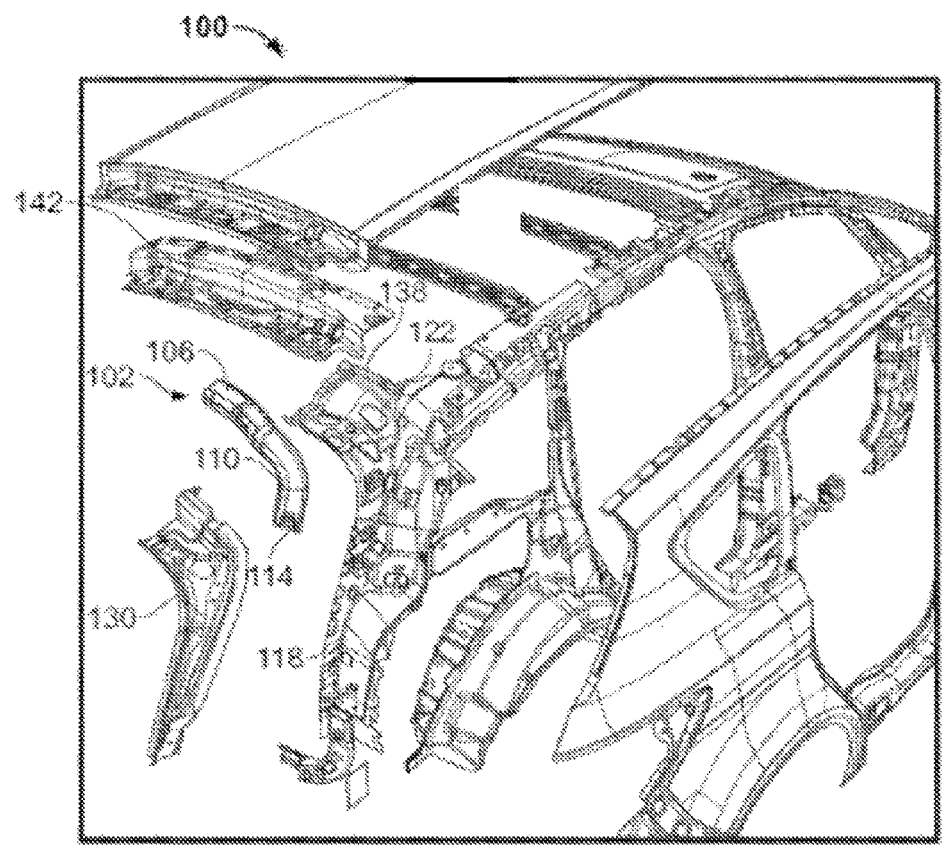
FIG. 3 is a perspective exploded view of a portion of a vehicle, showing the different components of the body in white structure of the vehicle, including the side-support structure according to the present disclosure.

FIG. 3 is an exploded view showing the different components of the body in white structure of a vehicle. The side-support structure 102, now shown isolated and disassembled from the vehicle, is configured to be mounted over an upper side portion 138 of the vehicle. The designed structure and shape of the side-support structure allows it to fit into the cavity 122 within the upper side portion 138. After mounting the side-support structure 102, the element 142 is positioned over the structure, to partially cover the structure.

The bracket 130 represents one of the conventional hydroformed reinforcement structures, shown merely for comparison with the side-support structure of the present disclosure. The bracket 130 was used earlier in some vehicles, to provide localized reinforcement to the body in white structure of the vehicle. As is clearly apparent, the side-support structure 102 is comparatively much more compact, and creates more package space, while being positioned within the body in white structure of the vehicle.

The side-support structure 102 of the present disclosure, as described in conjunction with the previous figures, is a continuous closed structure, which efficiently transfers loads from the roof panel to the side-pillar, and eventually, to the underbody structure of the vehicle. The structure imparts significant torsional stiffness to the body in white structure of the vehicle. Further, being formed by hydroforming, the side support structure is light weight in comparison to the conventional localized reinforcement structures, and significantly improves the package space, as mentioned earlier.

Although the current invention has been described comprehensively, in considerable detail to cover the possible aspects and embodiments, those skilled in the art would recognize that other versions of the invention may also be possible. Further, though, different embodiments of the present disclosure have been set forth above, and different constructions of the invention have been depicted in the appended drawings, however, the disclosed embodiments are not intended to define or limit the scope of the disclosure, such limitation being solely contained in the claims appended hereto, and therefore, other embodiments for carrying out the invention are also possible.

What is claimed is:

1. A side-support structure mountable over an upper side portion of a vehicle, the side-support structure comprising:
    an upper horizontal portion attached to a portion of the vehicle roof panel;
    a central arcuate portion extending between the roof panel and a side-pillar of the vehicle; and
    a lower vertical portion attached to an upper portion of the side-pillar;
    wherein
        the side-support structure is mounted and adapted to transfer at least a portion of a load from the roof panel to the side-pillar; and
        the side-support structure is hydroformed from a continuous closed structure of metallic material.

2. The side-support structure of claim 1, wherein the side-support structure is hydroformed from a continuous closed structure of plastic material.

3. The side-support structure of claim 1, wherein the central arcuate portion has a base having a surface profile substantially matching with a surface profile of a portion of the vehicle between the roof and the side-pillar of the vehicle.

4. The side support structure of claim 1, wherein the lower vertical portion has a substantially rectangular cross-section, and is flattened with respect to the upper horizontal portion.

5. The side-support structure of claim 1, and having a substantially L-shaped structure, wherein the lower vertical portion and the upper horizontal portion form arms of the L-shaped structure.

6. The side-support structure of claim 1, wherein the central arcuate portion of the side-support structure is configured to transfer loads from the upper horizontal portion to the lower vertical portion of the side-support structure.

7. The side-support structure of claim 1, wherein the lower vertical portion has a lower end connected to an upper portion of the side-pillar of the vehicle.

8. The side-support structure of claim 1, and being one of welded, soldered, brazed, bonded or mechanically fastened to an upper side portion of the vehicle.

9. The side-support structure of claim 1, having a substantially hollow tubular shape, formed by hydroforming.

10. The side-support structure of claim 1, wherein the side-pillar is an A-pillar, a B-pillar, a C-pillar, or a D-pillar of the vehicle.

11. The side support structure of claim 1, being spot-welded at multiple locations to the upper side portion of the vehicle.

12. A side-support structure for a vehicle, comprising:
    an upper portion mounted in a cavity within a roof panel of the vehicle, the upper portion being securely attached to the roof panel;
    a lower portion mounted over, and attached to an upper portion of a side-pillar of the vehicle; and
    a central arcuate portion connecting the upper portion to the lower portion, the central arcuate portion being positioned over a curved edge of the vehicle between the roof panel and the upper portion of the side-pillar,
    wherein
        the side-support structure is mounted and adapted to transfer at least a portion of a load from the roof panel to the side-pillar; and
        the side-support structure is hydroformed from a continuous closed structure of a metallic material.

13. The side-support structure of claim 12, being mounted over an upper side portion of the vehicle, and configured to transfer loads from the upper side portion to the side-pillar, and to an underbody structure of the vehicle.

14. The side-support structure of claim 12, wherein the side-pillar is an A-pillar, a B-pillar, a C-pillar, or a D-pillar of the vehicle.

15. The side-support structure of claim 12, wherein the lower portion has a flattened shape with respect to the upper portion.

16. The side-support structure of claim 12, wherein the side-support structure is formed from a continuous closed structure of plastic material.

17. The side-support structure of claim 12, wherein the central arcuate portion has a base having a surface profile substantially matching a surface profile of the curved edge of the vehicle between the roof panel and the upper portion of the side-pillar.

18. The side-support structure of claim 12, having a substantially L-shaped structure, wherein the lower portion and the upper portion form the arms of the L-shaped structure.

19. The side-support structure of claim 12, and being welded, soldered, brazed, or mechanically fastened to the upper side portion of the vehicle.

* * * * *